United States Patent
Wassel et al.

(10) Patent No.: US 9,049,753 B1
(45) Date of Patent: Jun. 2, 2015

(54) LIGHTING DEVICE MONITOR AND COMMUNICATION APPARATUS

(75) Inventors: James J. Wassel, Fombell, PA (US); John R. Roney, Renfrew, PA (US)

(73) Assignee: APPALACHIAN LIGHTING SYSTEMS, INC., Ellwood City, PA (US)

(*) Notice: Subject to any disclaimer, the term of this patent is extended or adjusted under 35 U.S.C. 154(b) by 475 days.

(21) Appl. No.: 13/588,926

(22) Filed: Aug. 17, 2012

Related U.S. Application Data

(60) Provisional application No. 61/525,448, filed on Aug. 19, 2011, provisional application No. 61/542,556, filed on Oct. 3, 2011.

(51) Int. Cl.
H05B 37/02 (2006.01)
H05B 39/04 (2006.01)
H05B 41/36 (2006.01)

(52) U.S. Cl.
CPC ........................ *H05B 37/02* (2013.01)

(58) Field of Classification Search
USPC ................................. 315/151, 158
See application file for complete search history.

(56) References Cited

U.S. PATENT DOCUMENTS

| | | | |
|---|---|---|---|
| 3,665,201 A * | 5/1972 | Shea et al. | 250/574 |
| 8,232,745 B2 * | 7/2012 | Chemel et al. | 315/308 |
| 2005/0128758 A1 * | 6/2005 | Brick | 362/411 |
| 2008/0084115 A1 * | 4/2008 | King et al. | 307/38 |
| 2009/0085500 A1 * | 4/2009 | Zampini et al. | 315/297 |
| 2010/0264846 A1 * | 10/2010 | Chemel et al. | 315/294 |
| 2010/0301769 A1 * | 12/2010 | Chemel et al. | 315/294 |
| 2010/0301771 A1 * | 12/2010 | Chemel et al. | 315/294 |
| 2010/0301774 A1 * | 12/2010 | Chemel et al. | 315/297 |
| 2011/0001436 A1 * | 1/2011 | Chemel et al. | 315/291 |
| 2013/0102076 A1 * | 4/2013 | Licamele et al. | 435/420 |
| 2014/0003051 A1 * | 1/2014 | Seff et al. | 362/249.02 |
| 2014/0032759 A1 * | 1/2014 | Barton et al. | 709/225 |
| 2014/0293993 A1 * | 10/2014 | Ryhorchuk | 370/350 |
| 2014/0337528 A1 * | 11/2014 | Barton et al. | 709/225 |
| 2015/0008741 A1 * | 1/2015 | Fleisig | 307/31 |

* cited by examiner

*Primary Examiner* — Adam Houston
(74) *Attorney, Agent, or Firm* — Arent Fox LLP

(57) ABSTRACT

A smart metered light fixture including a light source. The light fixture includes a surge protection device with a monitor that indicates when surge protection fails. The light fixture includes a power supply monitor configured to collect real-time AC current, voltage, and power factor measurements from a power supply. An operational characteristic monitor monitors an operational characteristic of the light source, such as current consumption, wattage, real-time temperature, a brightness level, and/or an efficiency of the light fixture. A communication device positioned between the power supply receives information from the monitors and wirelessly transmits information regarding the monitored operational characteristic and information and/or power supply measurements to a remote user equipment. The communications device may also receive control instructions from the remote user equipment for controlling aspects of the light source.

24 Claims, 8 Drawing Sheets

LIGHTING DEVICE MONITOR AND COMMUNICATION APPARATUS

CLAIM OF PRIORITY UNDER 35 U.S.C. §119

The present application for patent claims priority to Provisional Application No. 61/525,448 titled "Lighting Device Communication Apparatus" filed Aug. 19, 2011, and Provisional Application No. 61/542,556, titled Lighting Device Including Power Supply and Surge Protection Monitoring, filed Oct. 3, 2011, the entire contents of both of which are hereby expressly incorporated by reference herein.

BACKGROUND

1. Field of the Application

Aspects relate, in general, to electronic power supplies, and specifically to lighting fixtures, e.g., luminaires, that utilize light emitting diodes (LEDs) as a light source and, more particularly, to lighting fixtures incorporating LEDs configured in a manner to amplify and direct light produced by such lighting fixtures. Aspects further include smart monitoring and remote control of such lighting fixtures.

2. Background of the Technology

It is desirable to adjust the amount of light generated by one or more light sources (e.g., incandescent light bulbs, fluorescent light fixtures, LEDs, etc.) in various lighting applications (e.g., home, commercial, industrial, etc.). In many cases, this is accomplished via a user-operated device, commonly referred to as a "dimmer," that adjusts the power delivered to the light source(s). Many types of conventional dimmers allow a user to adjust the light output of one or more light sources via various types of user interface (e.g., by turning a knob, moving a slider, etc.) which is often mounted on a wall in a proximity to an area for which it is desirable to adjust the light level. Accordingly, there is a need for providing a dimmer switching and adjustment mechanism that allows two-way enhanced remote control of lighting fixtures.

It is further desirable to monitor aspects of a power supply used by and to provide surge protection for one or more light sources. LED fixtures as well as most electrical appliances have some form of an electronic power supply. Although hand held and other test equipment exist, such equipment is completely external to the electrical appliance and the power supply. Thus, the test equipment would have to be positioned in front of the equipment on the AC input side. Accordingly, there is a need for providing more accurate power source measurements.

Surge protection may be provided for a light fixture. However, when such surge protection stops functioning, power in most cases (unless due to a catastrophic failure) continues to flow to the light fixture without any external evidence of failure and will no longer provide surge protection for the next incident of surge. Accordingly, there is a need for better surge protection.

SUMMARY OF THE APPLICATION

Aspects described herein overcome the drawbacks of previous systems by providing a two-way RF to WiFi remote control system for lighting fixtures that is configured to measure and report wattage and voltage of the lighting fixture, control the level of brightness/dimness of the lighting fixtures, and provide the ability to mesh a plurality of such remote systems together.

The system communicates with a plurality of lighting fixtures and can instruct the lighting system to pass such signals to additional lighting fixtures. The plurality of lighting fixtures may be located at multiple physical locations apart from each other. The control system may be used to remotely monitor, communicate, and control the lighting fixtures and other attached or component devices via the Internet.

Aspects further provide a way to more accurately measure and report such power measurements by incorporating an AC power measurement device into the light fixture to make power measurements of the power supply. The power measurement device may be incorporated within the structure of the power supply, or may be provided external to the power supply. The measurement device may transmit in real time, the electronic power supply's current, voltage, and power factor readings, out of the electronic power supply in a digital format through an optical isolation device. This optical isolation device will transmit the information via a wire to a communication device such that the measurement readings of power consumption information can be wirelessly transmitted to a remote device.

Aspects may further include a smart surge protection device connected to the power supply. Aspects may further include remotely monitoring such a device.

Additional advantages and novel features of these aspects of the application will be set forth in part in the description that follows, and in part will become more apparent to those skilled in the art upon examination of the following or upon learning by practice of the application.

DETAILED DESCRIPTION

Figure 1:
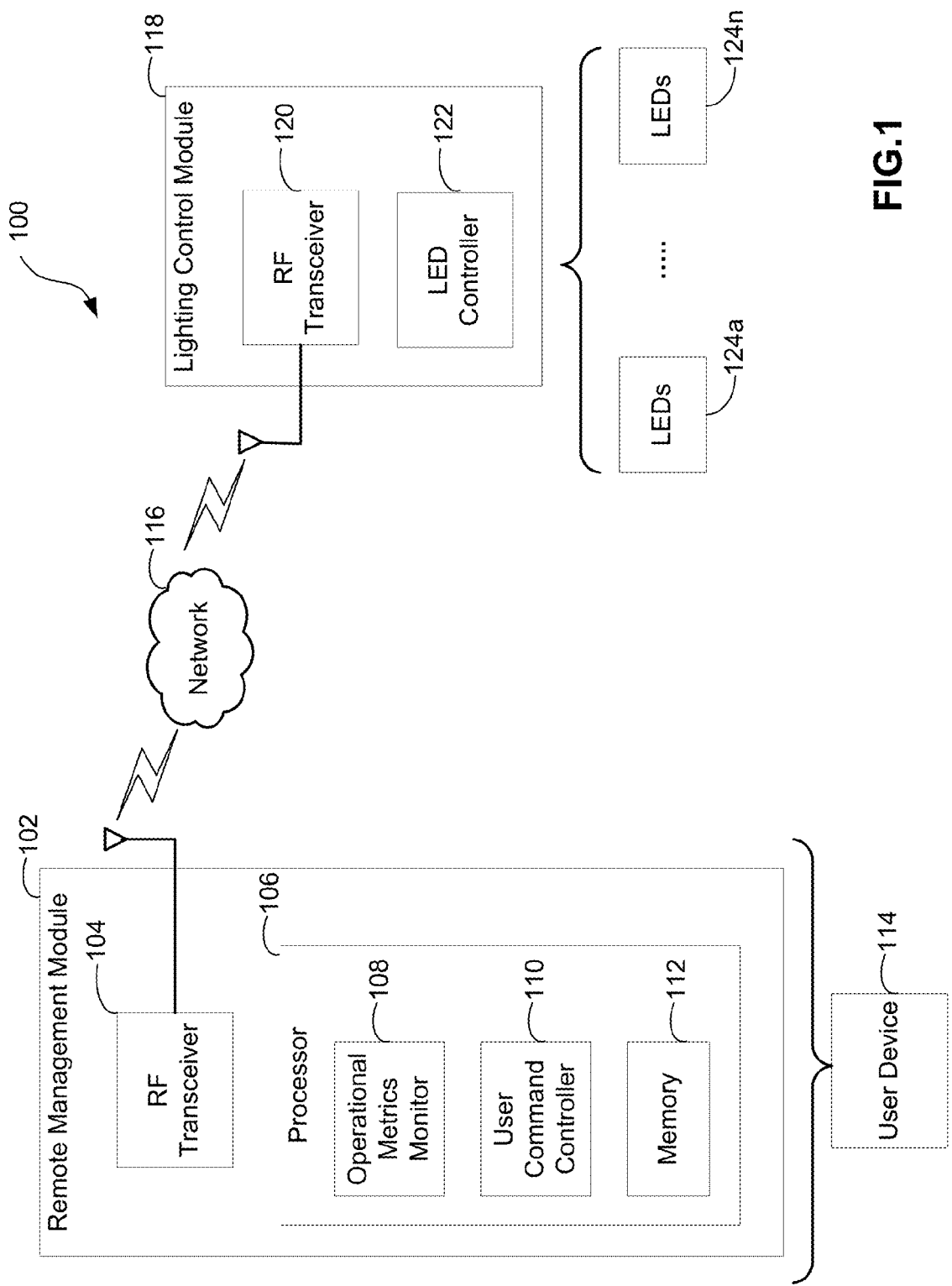
FIG. 1 presents an example diagram of a wireless lighting device communication system and apparatus in accordance with aspects of the present application.

Referring to FIG. 1, a schematic system diagram 100 of an example remote control module 102 in communication with a wireless lighting module 118 via a network 116 in accordance with aspects of the present application. Remote control module 102 may include a computer circuit integrated with a microcontroller 106 driven RF transceiver module 104 for securely communicating with various wireless devices connected with the wireless network 116. In some examples, network 116 may be contemplated via various conventional and/or advanced wireless network techniques. In one aspect, a wireless mesh network (WMN) may advantageously offer a broadband wireless communication environment for areas where wired infrastructure is not available or not worthy to deploy. Due to WMN's inherent characteristics, such as self-configuring and self-healing capabilities, the WMN can be easily deployed and maintained. However, those of skill in the art will recognize that the devices and methods disclosed in this specification may also be useful for connecting devices to and configuring devices for any suitable types of wireless networks.

Remote control module 102 is configured to provide two-way RF to WiFi communication to remotely control and/or program the dimming function of a plurality of lighting fixtures 124a-124n. In some implementations, the processor 106 embedded in the remote control module 102 may include an operational metrics monitor module 108 for monitoring and reporting the operational metrics and health of the lighting fixtures 124a-124n such as current electricity consumption with a fail-safe mode of operation. Here, the fail-safe mode of operation generally refers to operation that can ensure a failure of equipment, process, or system does not propagate beyond the immediate environs of the failing entity, as well as a control operation or function that prevents improper system functioning or catastrophic degradation in the event of circuit malfunction or an operator error. Among others, example operational metrics may include a wattage used by each individual or all of the lighting fixtures 124a-124n, real-time temperature of the fixtures, the amount of the fixtures' capacity that is currently being used, a level of brightness of the fixtures, and a level of efficiency of the fixtures. The system 100 may be used to communicate with and program the plurality of lighting fixtures 124a-124n, which may be located in different physical locations apart from each other. In some examples, the lighting control module 118 may include circuitry having a unique and highly efficient DC/DC converter to utilize and control the same voltage available to and powering each LED in the lighting fixtures 124a-124n.

As will be explained in details below, present application includes a method of and system for remote secure control of the dimming function of a single LED lighting fixture, or multiple fixtures 124a-124n simultaneously as part of an array. Aspect may include a method of and system for remote secure monitoring of voltage, current consumption, and temperature of a single LED lighting fixture, or multiple fixtures simultaneously as part of an array. The method and system may be further configured with the ability to group a number of fixtures together as an array in part of a much larger network to control multiple arrays of fixtures at different dimming levels. Aspects may also include the provision of a fail-safe operation of the LED lighting fixtures 124a-124n in the event of an over temperature condition.

In some examples, the system 100 may include a computer board (not shown) configured to control the output intensity of the fixture to prevent a thermal runaway condition. Disclosed system/method herein may further include a fail-safe operation of the LED fixtures 124a-124n in the event of loss of RF network signal. For example, the computer board may be configured to maintain its existing state in the event of a loss of RF communication. Aspects may further include a fail-safe operation of a particular or multiple LED fixtures in the event of loss of computer board DC/DC power. For example, the computer board may be configured to enable the fixture intensity to 100% in the event of a computer board DC/DC failure. Aspects may further include the recovery of normal operation after a power failure event without user intervention.

As discussed above, lighting fixture control devices available on the market are designed to work on the AC side of High-Intensity Discharge Lamp (HID), High Pressure Sodium (HPS), fluorescent and LED fixtures. The system 100 described herein can be designed to work on the DC side (light output side) thereby protecting it from transient surge and spikes and other power line issues. Among others, benefits may include being able to run the system 100 on very minimal voltage and also being able to make it work with harvested radio frequency voltage.

Such a system 100 can be configured to be applied in multiple situations. For example, aspects of the controller may be designed for use in offices and in parking garage applications for daylight energy harvesting. In some embodiments, the power source may employ any and all forms of energy harvesting. Energy harvest may, without limitation, include capturing radiofrequency energy, converting kinetic energy to electrical energy (including converting motion or tension into electrical energy), converting thermal energy into electrical energy, converting wind energy into electrical energy, and so on. In some examples, energy harvesting may include collecting light from other light sources and converting that light into electrical energy. It will be understood that a variety of systems and methods that harvest energy are possible. In some other examples, the power source may be contemplated through wireless power transmission where a method of wireless power transmission may act as the power source or in combination with the other power sources (e.g., rechargeable batteries, capacitors, and the like) to provide power to relevant on-board modules. Power sources that can be used stand alone (i.e., not connected to a traditional AC power source) may be defined as wireless power. In one aspect, a wireless power source may allow the installation of the lighting control module 118 in any indoor or outdoor location where light may be desired without the need for a wired connection to an AC power source. Additionally, aspects of the computer controlled version can be configured for use in other indoor and outdoor lighting systems.

In one aspect, the remote control module 102 can be accessed and controlled via the Internet on a user device 114. For example, the remote control module 102 may be configured to be controlled by Smart phone technology, as there currently exist a variety of wireless devices, including mobile phones, personal digital assistants (PDAs), laptops, and paging devices that are small, lightweight, and easily carried by users. These devices may include the ability to transmit voice and/or data over wireless networks. Some of these wireless devices may utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device and the software applications. As such, the wireless device functionality can be made available to the software applications by allowing the software to make a generic call for a function without requiring a developer to tailor its source code to the individual hardware or device on which the software is executing. Further, some APIs can provide mechanisms for secure communications between wireless devices, such as client devices and server systems, using secure cryptographic key information.

In some other implementations, the remote control module 102 may be configured with its own hand held remote control device 114. When adding such a device 114 to home, office buildings and automotive electronic components, the device 114 can be configured to feed back all necessary data to be able to give real time monitoring control and to further manage light fixtures 124a-124n in a way to increase their energy efficiency.

In one example, as shown in FIG. 1, the remote control module 102 may include a user command controller 110 for obtaining and processing user commands to communicate with a plurality of wireless lighting modules in various formats. A user may enter a command through keyboards, mice, trackballs and joysticks. These input devices are used to control cursors, mouse pointers etc. in order to manipulate, e.g., buttons, switches, dials, knobs that are displayed graphically on a display screen of the user device 114 for controlling the remote lighting fixtures 124a-124n. In some examples, lighting fixtures 124a-124n may be associated with dedicated channels such that the user can select a channel number via the remote control module 102 by referring to specific channel numbers. In other examples, the channel number assigned for the remote lighting fixtures 124a-124n may be preprogrammed, randomly generated, or previously stored in a memory 112. Example commands may include an "on/off" toggle command, an "on" command, an "off" command, a "dim" command, a "brightness" command, a "color change" command, or a timer command.

The user command controller 110 may also provide the user with a voice command input means by using, e.g., a voice recognition module which receives a voice command from the user. The voice command is then identified as a specific command or a fuzzy command using a fuzzy logic algorithm. If the voice command is a specific command, one of the operations corresponding to the voice command is adjusted. If the voice command is a fuzzy command, a plurality of the operations corresponding to the voice command is adjusted. Further, if the adjusted operations do not meet the user's expectation, the user can further modify the operations using an adjustment modification process. A process of modifying the operations can be performed by, e.g., another voice command. Since a specific command means a specific operating action, this operating action can adjust a specific category of the remote lighting fixtures 124a-124n. The specific category can be stored in, for example, the voice recognition module or the memory 112, depending on design requirements. If this specific command, for example, is "decrease brightness", then this specific command can directly adjust the brightness of the remote lighting fixtures 124a-124n. On the other hand, a fuzzy command may involve adjusting the lighting fixtures through a plurality of operations. The operations can be stored in the voice recognition module or the memory 112, or even an independent command database, depending on the design requirements. Accordingly, a series of operations can be issued to adjust the remote lighting fixtures 124a-124n in a plurality of steps.

After the user inputs a command through the command input 530, processor 106 may encode the command and subsequently instruct the RF transceiver 104 to transmit an RF signal that includes the encoded command. In one example, the RF transceiver 104 transmits RF signals at a predetermined frequency, or a user selected-frequency. The RF signal may be transmitted once, or for a predetermined number of times, or for a predetermined time period. If more than one RF signal is transmitted, each transmission may be separated by a predetermined time interval.

The lighting control module 118 can include an RF transceiver 120 that monitors for RF signals at a predetermined frequency. For example, the RF transceiver 120 periodically monitors for RF signals, or continuously monitors for RF signals from network 116. When an RF signal is received, the signal is transmitted to LED controller 122, where the signal is decoded. In one aspect, the LED controller 122 may obtain and compare a decoded channel number that is included in the command to a specific LED channel number. For example, if the command is an on/off toggle command, the lighting control module 118 may instruct the LED controller 122 to toggle a plurality of LEDs 124a-124n. If the command is an "on" command, the LED controller 122 may first determine if the plurality of LEDs 124a-124n are in an "on" state. If the LEDs 124a-124n are not in an "on" state, the LED controller 122 can activate the plurality of LEDs 124a-124n.

As shown in FIG. 1, the RF transceivers 104 and 120 allow two-way communication. In some implementation, the remote control module 102 may be programmed to repeatedly transmit a command signal until a confirmation signal is received. Additionally, the lighting control module 118 may be programmed to transmit a confirmation signal upon receipt of an RF signal, or upon successfully decoding a command. In another example, the RF transceivers 104 and 118 can provide the remote control module 102 with feedback relating to a state associated with the lighting control module 118 (e.g., whether the LEDs 124a-124n are in an "on" state, an "off" state, an intensity of the LEDs 124a-124n, and the life of certain relevant components). Moreover, RF transceivers 104 and 118 can allow the lighting control module 118 to communicate with other disparate wireless lighting control module(s) (e.g., to propagate or repeat signals).

The lighting control module 118 in FIG. 1 may comprise a PCB assembly that is configured to adjust voltage to a control pin of a LED constant current type power supply based on dimming commands from the RF transceiver 104 and 120 and relevant software programmed to meet specific requirements. Multiple such constant current LED supplies can be controlled and monitored from this one PCB assembly. For example, at least two such constant current LED supplies can be controlled and monitored from a single assembly, one controlling resistor dividers to set the current for one supply, while Q7, Q8, Q9, Q10 control the other.

In some aspects, an on-board DC/DC converter can be included to use same voltage as given to the LED 124a-124n.

Current monitoring (LED power consumption) can be achieved through U2, and U3. Such a component can be supplied for each of the power supplies being monitored, as these components sense LED current through a sensing resistor Rsense R1/Rsense R2. The current signal can be amplified by U2/U3 and is ultimately driven as a voltage into pins of a RF engine which will described fully below. Additionally, the PCB assembly may include resistor dividers (R9/R13 and R36/R37) to sense the voltages of the LED rails and drive those values into the RF engine where certain computing can be performed to calculate the actual power consumed by the LEDs 124a-124n. In some examples, current monitoring (U2, U3) for two separate power supplies/LED banks may be provided. Since no LED driver board is present for this design, the dimming of the LED 124a-124n may be contemplated by hardware switching of 4 hardware "steps" to realize 5 dimming levels (Q1, 2, 4, 6 and Q7, 8, 9, 10) of the LED 124a-124n.

Elements J3 and J4 may be used as a unit for enabling the wireless communication of the lighting control module 118. In one aspect, an RF engine, such as a Synapse™ RF engine, can be plugged into elements J3/J4. An RF engine may include the hardware to communicate via RF, along with a microcontroller that drives all the signals to actively read the health and control the dimming of associated LEDs. For example, it may be beneficial for the RF module to run from a voltage similar to that used to drive the lighting fixtures LEDs 124a-124n. A Synapse™ module, for example, runs from 3.3V DC. The 3.3V DC may be generated from the same voltage that is used to drive the LEDs 124a-124n. The DC/DC converter control IC (U1) along with its supporting R's and C's steps the LED rail voltage down to the level required by the Synapse™ module. This DC/DC converter can be used in various applications as the LED rail voltage needed to run this converter can be between 12-75V DC.

In some implementations, lights can be quickly configured to different channels to group lights together for specific location dimming control abilities. Jumpers JP2/JP3 may set the address to which location the LEDs will be located. In other words, jumpers JP2/JP3 may be used to set addresses to allow groups of lighting fixtures to be established by location. Moreover, JP1 may be utilized to initiate a hardware test mode for manufacturing/debug purposes. For example, the test mode jumper JP1 can be used to perform manufacturing testing of the dimming modes and communication abilities. Jumpers may also set the unit in test mode and will cycle through all the dimming steps along with broadcasting current and voltage data back to any RF engine on the network set to receive these signals.

Fail-safe thermal protection may be achieved through multiple methods, one being a thermal sensor which may be external to the PCB assembly. This sensor along with the software programmed into RF engine will sense and determine a level which LED dimming will occur due to an over temperature condition. In the event that the DC/DC converter fails and no RF engine function can occur, an additional thermal switch will manually (through hardware control) drive the dimming function to a pre-determined level to reduce the heat generated by the LEDs when the lower temperature is satisfied by the thermal switch such that normal operation can resume.

A dimming function may also be configured with a fail-safe because all signals to control dimming are actively driven from the RF engine. In the event that the RF engine experiences a failure, or the DC/DC converter fails (shutting off the RF engine) the light will assume full brightness. Full brightness is the default state unless actively driven to a lower dimming state by the RF engine or hardware thermal control.

Further, temperature monitoring via a thermal switch (connected to J6) in the event of some hardware or software failure, absolute maximum temperature of the LED 124a-124n may be controlled directly through hardware.

Additionally, temperature monitoring may be employed by a sensor for providing relevant information to the lighting control module 118 such that the dimming levels can be controlled through software, hardware or combination thereof.

Although the example is described in connection with a Synapse™ RF engine, it is understood that any number of RF chips can be contemplated.

A dimmer device may comprise a five step dimmer schematic of the PCB assembly describe above. These dimming steps may be commanded by a master control RF engine on a network, or locally from thermal control hardware. The schematic shows the lighting control module 118 may include an RF engine connector, DC/DC circuitry, I Monitor circuitry, and four elements. The lighting control module 118 may further include connections between the illustrated components. Thus, aspects include using a programmable chip placed on the lighting control module 118 and its associated circuitry which is installed on the DC side of the power supply in the LED lighting fixtures 124a-124n. The programmable chip may be, for example, a Synapse™ chip.

The lighting control module 118 in FIG. 1 may include an on-board DC/DC converter (U1) that can be included to use same voltage as supplied to the LED 124a-124n. Current monitoring U2 can be employed for one power supply/LED bank. Since this design may be used to work in conjunction with an LED driver board (not shown), pulse-width modulation (PWM) dimming may be realized. Compared with DC dimming, PWM dimming has advantages of a constant lighting color, and good stability at low brightness. In one example, Q1 and its surrounding passive components may translate the PWM signal to be compatible with the existing driver board. A much larger number of dimming "steps" can be obtained by adjusting the dimming signal from, e.g., the Synapse™ module. In some implementations, temperature monitoring may not be included on this board. Temperature monitoring via thermal switch may similarly not be included on this board. In one aspect, Synapse™ wireless communication/control module may be plugged into J1 as a unit. Jumpers ADR0, ADR1 may be used to set address to allow groups of lights to be established by location. A TEST jumper may be utilized as a hardware initiated test mode to aid in manufacturing/debug process.

A PCB assembly with PWM dimming capabilities may include an RF engine connector, DC/DC converter circuitry, I Monitor circuitry, and a PWM circuitry.

It may be desirable to include such PWM components so that the LED lighting fixtures 124a-124n can be serviced with only one PCB by allowing temperature monitoring/control in additional to the PWM dimming capabilities.

Figure 2:
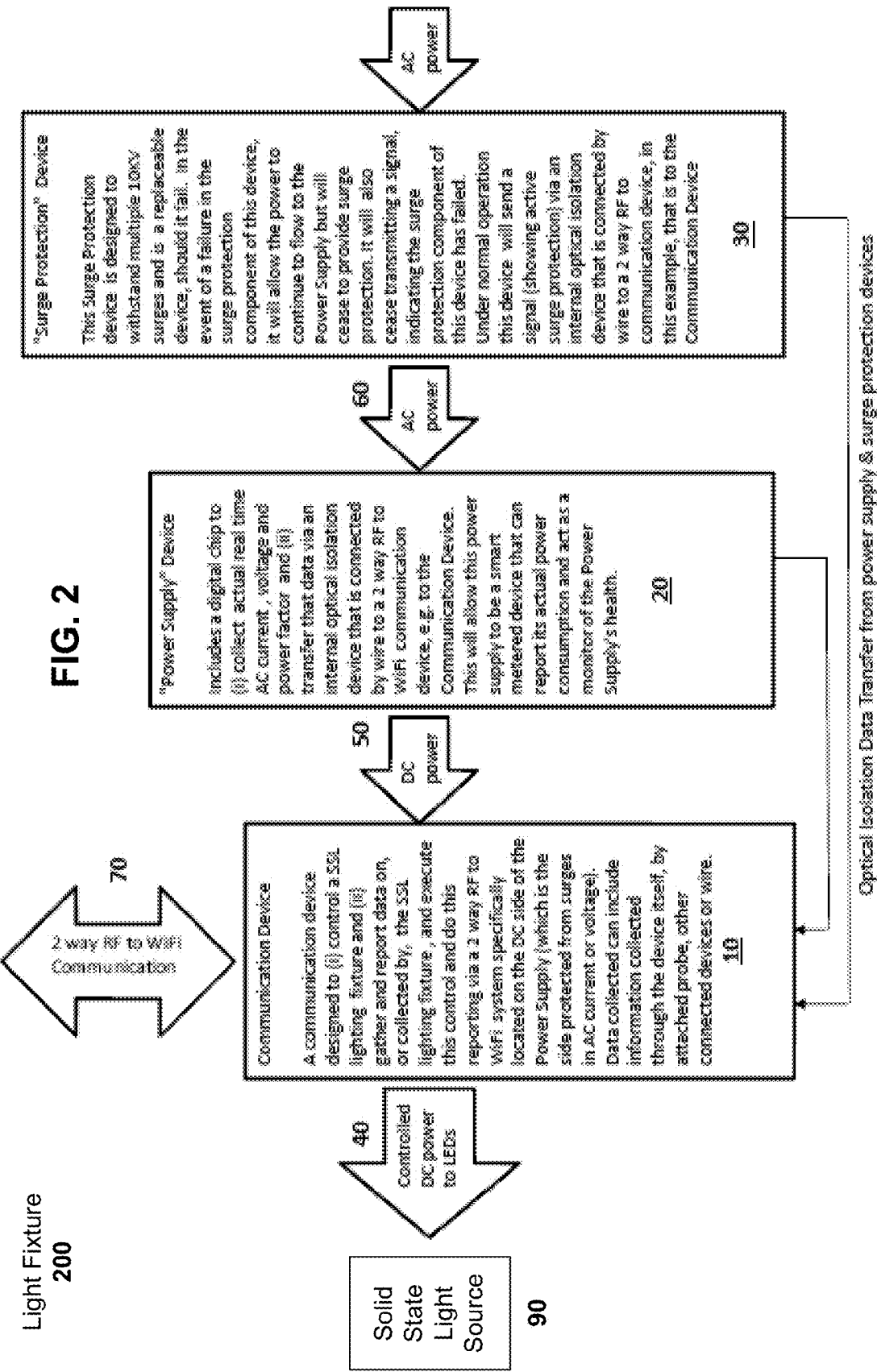
FIG. 2 presents an example diagram of a light fixture in accordance with aspects of the present application.

FIG. 2 illustrates a lighting fixture system diagram that illustrates a light fixture 200 include various device provided internal to the light fixture and integrated therewith. The light fixture includes a communication device 10 configured to control a lighting fixture, to gather data regarding the lighting fixture, and to report the data. The communication device may gather such information, report, and perform control using a two-way RF to WiFi system. The data may be communicated wirelessly. For example, the communication may occur via a 2-way RF to WiFi connection 70. The communication device can be located on the DC side of a power supply 20, as this side will be protected from surges in the AC current or voltage. Controlled DC power is provided to a solid state light source 90, e.g., LEDs 11, via connection 40. The communication device may collect and report information gathered through the circuitry of the communication device itself or the information may be gathered via a probe attached between the communication device and the lighting fixture. Such information may include data, measurement information regarding the light source itself, and may further include audio, video, or other information from additional components provided at the light source. For example, an audio and/or video device may be provided at the light fixture. The communication device 10 may be positioned between a power supply 20 and the LED circuit strips 11 of the lighting fixture. For example, the lighting control module 118 may be the communication device 10 in FIG. 2.

FIG. 2 illustrates a power supply device 20 positioned between the communication device 10 and a surge protection device 30. The surge protection device 30 is positioned between the AC power source 80 and the power supply 20. The power supply device 20 receives AC power 60 and outputs DC power 50 for use by the lighting fixture. The light fixture may include a power monitor, such as a digital chip that is configured to collect real time AC current, voltage, and power factor information from the power supply. The power monitor may be provided inside the power supply and may transfer such information through an optical Isolation Device via wire to a communication device. Alternately, the power monitor may be provided within the light fixture, external to the power supply. Optical isolation devices may be provided within the power supply and the surge protection device that can be connected, e.g. via a wire, to a 2-way RF to WiFi communication device. For example, the connection may be to the communication device 10. This enables the power supply to be a smart metered device that is capable of reporting its actual power consumption and to monitor its ongoing efficiency. It also enables the surge protection device to become a smart device, as well as to monitor and report its ongoing protection or the failure or such protection, in which case it can be replaced. This should enable the surge protection device to be, ideally, replaced before another surge hits the light fixture.

This overcomes previous inaccuracies in power usage measurement. For example, if only the DC power usage is measured, the system may actually be consuming a higher amount of AC power due to inefficiencies in the power supply. Such inefficiencies may occur due to damage, age, etc. By measuring the AC power consumption at the power supply a very accurate report on the ongoing health of the power supply can be provided. For example, a monitoring chip may be positioned to perform measurements at the point where the power supply receives the AC power 60.

The system may further include a surge protection device 30 connected between the power supply device 20 and a source of AC power. The surge protection device provides a connection for the AC power source to the power supply device.

Figure 3:
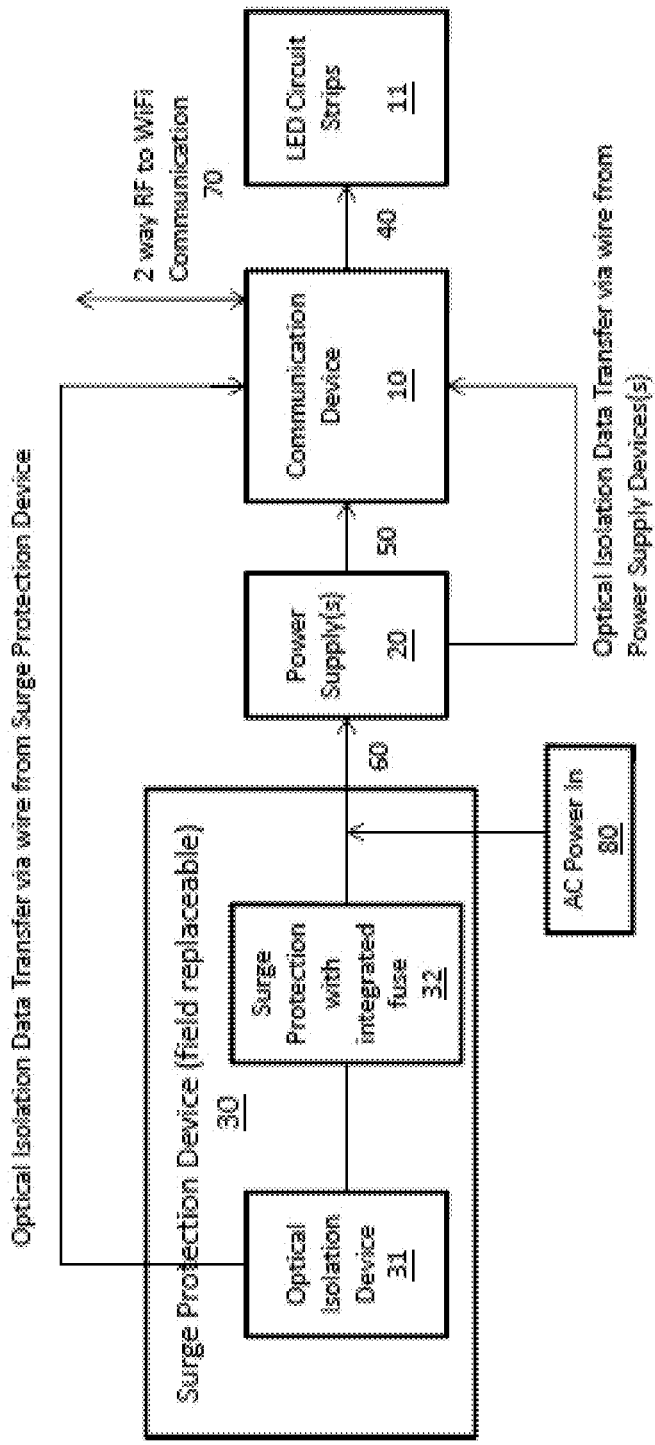
FIG. 3 presents an example diagram of a light fixture in accordance with aspects of the present application.

The surge protection device 30 provides surge protection along with remote monitoring. The surge protection device includes a surge protection component having connections between the AC power source and one or multiple power supply devices 20. Until a single or multiple power surge(s) occur that disable a surge protection component, AC power is supplied on a protected line. The protected connection includes a surge protection component. FIG. 3 illustrates a surge protection component within the surge protection device 30. The surge protection component 32 may include, for example, an integrated fuse. The surge protection component can be configured to withstand multiple 10 KV surges. Once one or a sufficient number of multiple power surge(s) occur the surge protection aspect of the surge protection component is disabled, the integrated fuse will also be disabled and will cease to allow current to flow to an internal optical isolation device 31.

At this time, the current that would go through the surge protection component 32 to the optical isolation device 31 stops. The surge protection device 30 does not provide surge protection, but allows a continued supply of power to the power supply device 20 so that the lighting fixture continues to operate.

Thus, the optical isolation device 31 within the surge protection device serves as a monitor that provides a signal indicating that the protected connection is operating correctly. For example, the surge protection device 30 may be monitored by the communication device 10. The monitor within the surge protection device 30 may send a simple yes or no signal (1 or 0) to the communication device, which is interpreted to mean that the surge protection component within the surge protection device is working or not. As another example, the signal to the communication device may comprise a 0-1023 varying digital representation of the health of a plurality of surge devices located in the light fixture. A zero signal indicates that the surge protection devices are functioning, and as the signal approaches 1023, it indicates that the surge protection devices have each failed.

When the surge protection and integrated fuse are disconnected/disabled, the signal ceases. The surge protection and integrated fuse are configured to fail simultaneously. This indicates that the surge protected connection has failed so that a user will be notified to replace the surge protection device. The signal may be transmitted via an internal optical isolation device that can be connected by a wire to a 2-way RF to WiFi communication device, e.g. communication device 10.

The surge protection device may have a modular, pluggable configuration for easy replacement if the surge protection device fails. As an example, if the surge protection component 32 fails, the entire surge protection device can be replaced. As another example, the surge protection device can be configured such that it can be replaced by cutting the AC connections to a failed surge board and recrimping new connections to a new surge board. The surge protection device described herein (i) remotely monitors the health of these individual surge components in each lighting fixture or other electronic equipment, and (ii) makes possible the method of easily changing the surge protection device in the field. The information signal goes to the communication device 10 over a wire coming from an Optical Isolation Device internal to the surge Protection Device 30 which can then be transmitted over the communication device's 2 way RF to WiFi capabilities.

Figure 4:
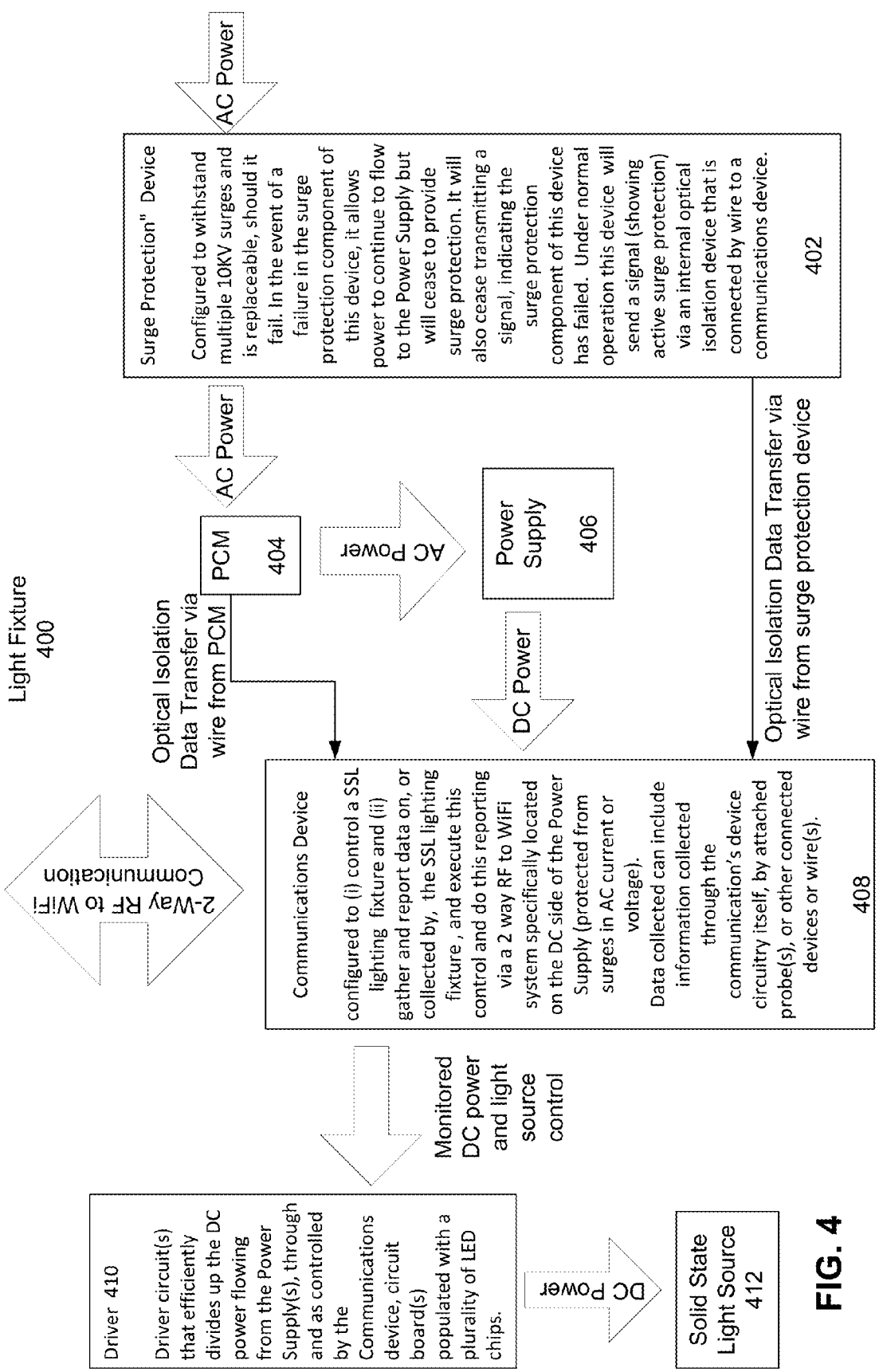
FIG. 4 presents an example of a diagram of a light fixture in accordance with aspects of the present application.

FIG. 4 illustrates an alternate diagram of a light fixture 400 including a surge protection device 402, a power monitor, e.g., power consumption monitoring circuit (PCM) 404, a power supply 406, a communications device 408, a driver 410, and a solid state light source 412. Communications device 408 may comprise a photocell sensor, as described herein. FIG. 4 illustrates that the surge protection device 402 receives and outputs AC power. The PCM 404 monitors the AC power received from the surge protection device 402. Then, the PCM 404 passes the AC power to the power supply 406. On the side of the power supply 406 opposite the PCM 404, DC power is output. The communications device 408 is provided between the power supply and the light source 412, and a driver may be provided between the communications device and the light source. The light source 412 is driven using DC power output from either the driver 410 or the communications device 408. The communications device is connected via an optical isolation connection to the surge protection device 402 and the PCM 404. The communications device transmits collected information to a remote management device via a 2-Way RF to WiFi communication link. Likewise, the communications device may also receive information, such as control instructions for controlling the light source.

The components illustrated in FIG. 4 are provided within light source 400 and are integrated therewith.

Aspects described herein may be applied to a lighting fixture, including the remote monitoring of the health of each of the MOV (metal oxide varistor) devices in an LED fixture remotely through a computer board. This number may include four MOV devices within an LED fixture.

By providing an ongoing connection between the AC power source and the power supply even after a disabling power surge has occurred, the lighting fixture will continue to operate as needed. The modular design of the replaceable surge protection device and the immediate reporting of it to Field maintenance personnel over the communication device enables quick field changing of defective devices in the field to allow for continued operation and to prevent further damage.

However, until a user is able to replace the surge protection device 30, the power supply is vulnerable to power surges. A power surge may reduce the efficiency at which the power supply operates. Therefore, it is beneficial to monitor the ongoing efficiency of the power supply in order to ensure that the overall system is operating efficiently.

By using a combination of the monitor within the power supply 20 and the monitor within the surge protection device 30, a user is informed of problems due to power surges without discontinuing operation of the lighting fixture. Optical isolation connections provide information monitored at the AC side of the system, e.g. at the AC side of the power supply 20 and at the surge protection device 30, to the communication device 10 positioned on the DC side of the system so that no direct connection between the AC and DC side is provided other than the power supply 20.

Aspects of the power supply 20 and surge protection devices can be applied to other systems. For example, the monitoring chip could be positioned to monitor the ballast of a fluorescent light. Such components could be used with other electronic equipment in order to inform a user when problems occur in the surge protector or power supply while providing ongoing use of the device.

Aspects described herein provide a method of incorporating AC mains measurement technology directly into AC/DC power supplies.

A method is provided to optically connect combined data from a measurement device to a computer board digitally in order to make use of the data after the isolation barrier of the power supply. This transforms passive power supplies into smart metered devices to enable power consumption data to be monitored and controlled in any appliance that makes use of an AC to DC power supply. This can be especially helpful in municipal light fixtures, such as street lights. A utility company typically charges a municipality based on an estimated power usage for such street lights. For example, the utility company may estimate the power used based on the known wattage of the light and a calculated amount of dark hours during which the lights would be used. The above described communication device enables a municipality to control the amount of power used by such lighting fixtures. For example, this enables a municipality to dim certain lights during specified nighttime hours to conserve energy consumption and reduce operating costs. By incorporating smart metering into the light fixture, the municipality can accurately report, and therefore be charged for, the actual amount of power used.

Smart monitoring in a replaceable surge protection device allows the municipality to know when surge protection devices need to be replaced. Smart metering in the power supply would also inform the municipality of any possible damage to the power supply.

Aspects described herein enable smart power metering into AC appliances through a combination of a power supply and AC line measurement chips and circuitry. Measurement data can be coupled to the safe low voltage side of the supply, isolating high potential AC from the user. Power supply data can be transmitted through a wireless computer board to monitor consumption data at a remote monitoring device/station.

Additionally, a photocell may be included in the light fixture. For example, the photocell may be used to determine the lighting conditions of the environment surrounding the light fixture so that a determination can be made when to turn on the light source. The photocell may be tuned to the visible light spectrum. For example, the photocell may determine when the environment is dark enough that the light source should be turned on. The light fixture may be programmed to use the photocell to determine when to turn the light source ON and OFF. For example, the light fixture may be programmed to turn the light source ON at a threshold light level detected by the photocell. Among others, the threshold light level may correspond to sundown, dusk, and after it becomes dark.

Rather than detecting sunlight directly, the photocell may be configured such that it senses light passed through from outside the light fixture. For example, a light transmitting component such as an acrylic tube or a glass tube may be used to pass light from the outside of the fixture to the photocell. The tube may be a replaceable. The light transmission tube may protrude from the light fixture, e.g., approximately ½ inch from the light fixture. A light transmission tube provides additional surface area to receive sample light, which increases the sensitivity of the photocell. Additionally, the configuration using a light transmission tube prevents direct sunlight from reaching the sensor. This leads to a longer photocell life. Alternately, a lens can be used for the programmable photocell.

The photocell can be an integrated part of an ALLink control system, e.g., communications device 10, 408, that operates from low voltage, e.g., 3.3 Volts. By providing the photocell on the lower voltage, DC side of the light fixture, the photocell is not affected by AC line surges.

The photocell may act similar to a photo activated transistor. For example, a small change in photons (light) bombarding the base (of the internal structure) of the photocell can cause a larger current to flow between a collector and an emitter of the photocell. As a result, the amplified version provides more range of digital bits to work with for a given small change in light.

The photocell is fully programmable. The photocell can be reprogrammed through wireless remote control. For example, the photocell may also be controlled via the remote control device that manages the light fixture's operation. The thresholds in which this transistor will activate/deactivate the light can be reprogrammed. Software control can adjust the thresholds of the ON/OFF operating points of the sensor in order to compensate for variations in the acrylic light tube that passes outside light in to the sensor. The adjustments to the activation threshold for the light fixture can be made manually by user definition, or by automatic software adjustments based on other light fixtures in the vicinity that make up a "network" of light fixture. For example, if 9 out of 10 lights on a street are reporting that it is time to turn the fixture off based on a reading from their respective photocells, and the tenth light is not providing the same reading, the control software can adjust the on/off thresholds of the tenth light in order to have its reading match the other nearby lights. In the event that the sensor becomes out of range, or un-responsive, the network can completely override the photo sensor input. In contrast to existing photoeye design, immediate replacement of the photocell is not necessary in order to maintain properly functioning lights.

Additionally, the component that passes light to the sensor, e.g., the acrylic tube, may also be a field replaceable item in the event it becomes too dirty or damaged to pass enough light for the photocell to provide an accurate measurement. The acrylic tube can be replaced without touching the photocell sensor.

Figure 5:
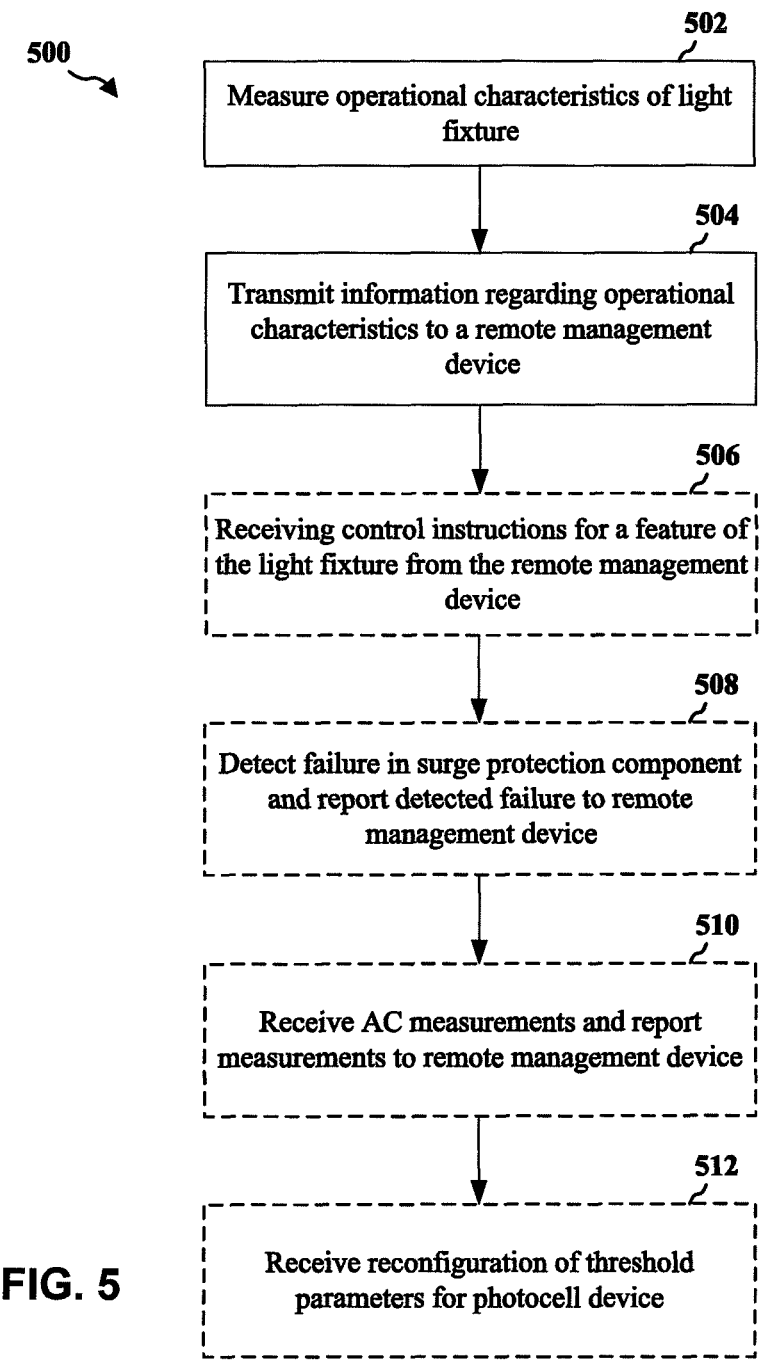
FIG. 5 presents a flow chart of an example method of operating a light fixture in accordance with aspects of the present application.

FIG. 5 illustrates aspects of an example method 500 of operating a light fixture in accordance with the present application. At step 502, at least one operational characteristic of a light source is monitored, e.g., via monitor that is both internal to an integrated with the light fixture. At step 504, information regarding the operational characteristic is transmitted from the light fixture to a remote management device. This information may be transmitted, e.g., via communications device 408 in FIG. 4, and may be sent via a 2-Way RF to WiFi communications link.

Optional aspects in FIG. 5 are illustrated using a dashed line. The method may further include receiving control instructions from the remote management device for controlling the light fixture. For example, the instructions may instruct the light fixture to dim the light source, to adjust a photocell sensor, and any of the other control instructions described herein. This information may be received by the communications device. Once instructions are received, the light fixture responds by implementing the instructions. These instructions may be implemented via the communications device or via a driver positioned between the communications device and the light source.

At step 508 a failure may be detected in surge protection at the light fixture. This detection may occur when the communications device receives an indication from a surge protection device via an optical isolation connection therebetween. Once a failure is detected, the communications device transmits a report of the failure to the remote management device.

At step 510, the communications device receives power measurements from a monitoring device on the AC side of the power supply. This measurement information may be received via an optical isolation connection. The communications device may also transmit this measurement information to the remote management device.

At step 512, the communications device receives reconfiguration parameters for a photocell sensor. The photocell sensor may be provided on the same circuit board as the communications device. Thereafter, the communications device adjusts the photocell sensor's parameters accordingly.

Figure 6:
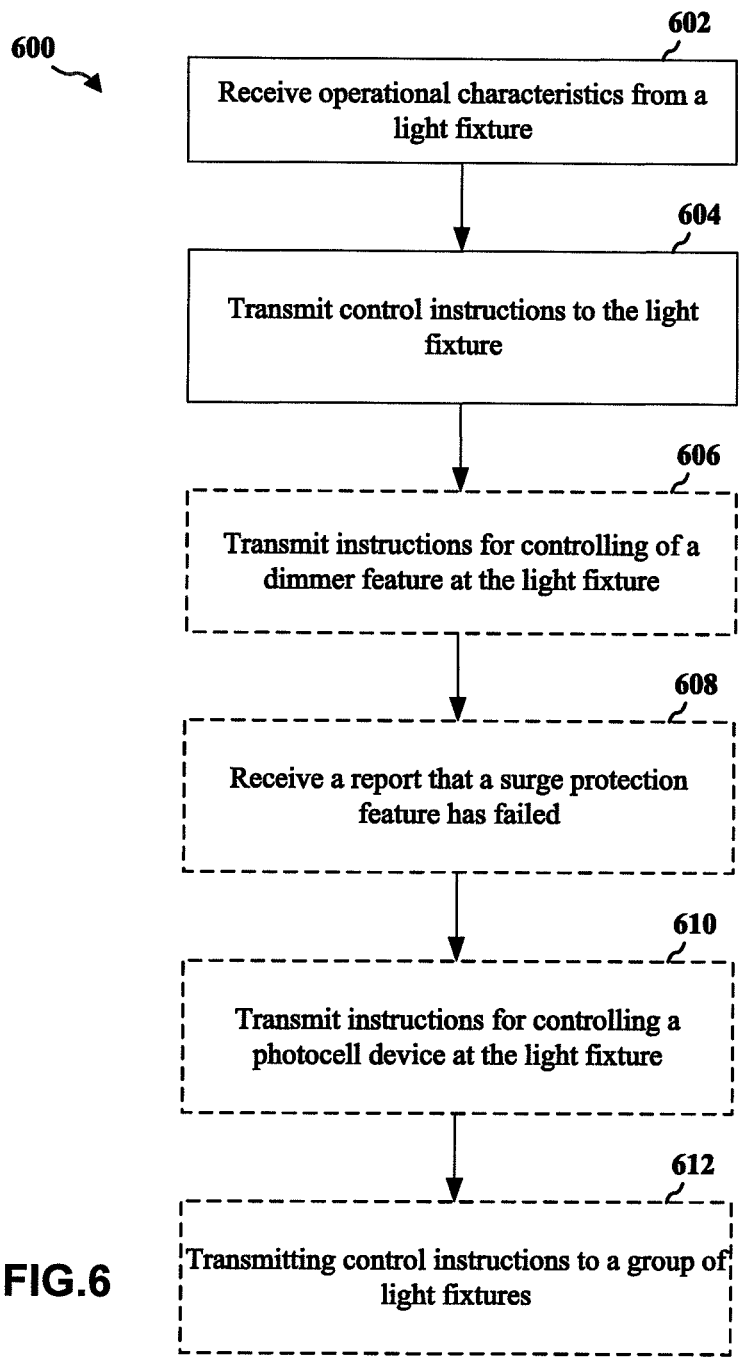
FIG. 6 presents a flow chart of an example method of remote management of a light fixture in accordance with aspects of the present application.

FIG. 6 illustrates a flow chart of a method 600 of controlling a light fixture using a remote management device. At step 602, operational characteristics are received from a light fixture. This may occur, e.g., via a 2-Way RF to WiFi communications link. At step 604, control instructions are transmitted from the remote management device to the light fixture. Among others, such instructions may control a dimming feature as in step 606, and a photocell as in step 610 of the light fixture.

At step 608, the remote management device receives an indication that a surge protection feature at the light fixture has failed. The light fixture may continue to operate without surge protection, and this report to the remote management device enables the user to schedule a replacement of a surge protection component while the light fixture continues to operate.

At step 612, the remote management device may be configured to communicate with and control a plurality of light fixtures. The light fixtures may be controlled individually or as groups of light fixtures.

Figure 7:
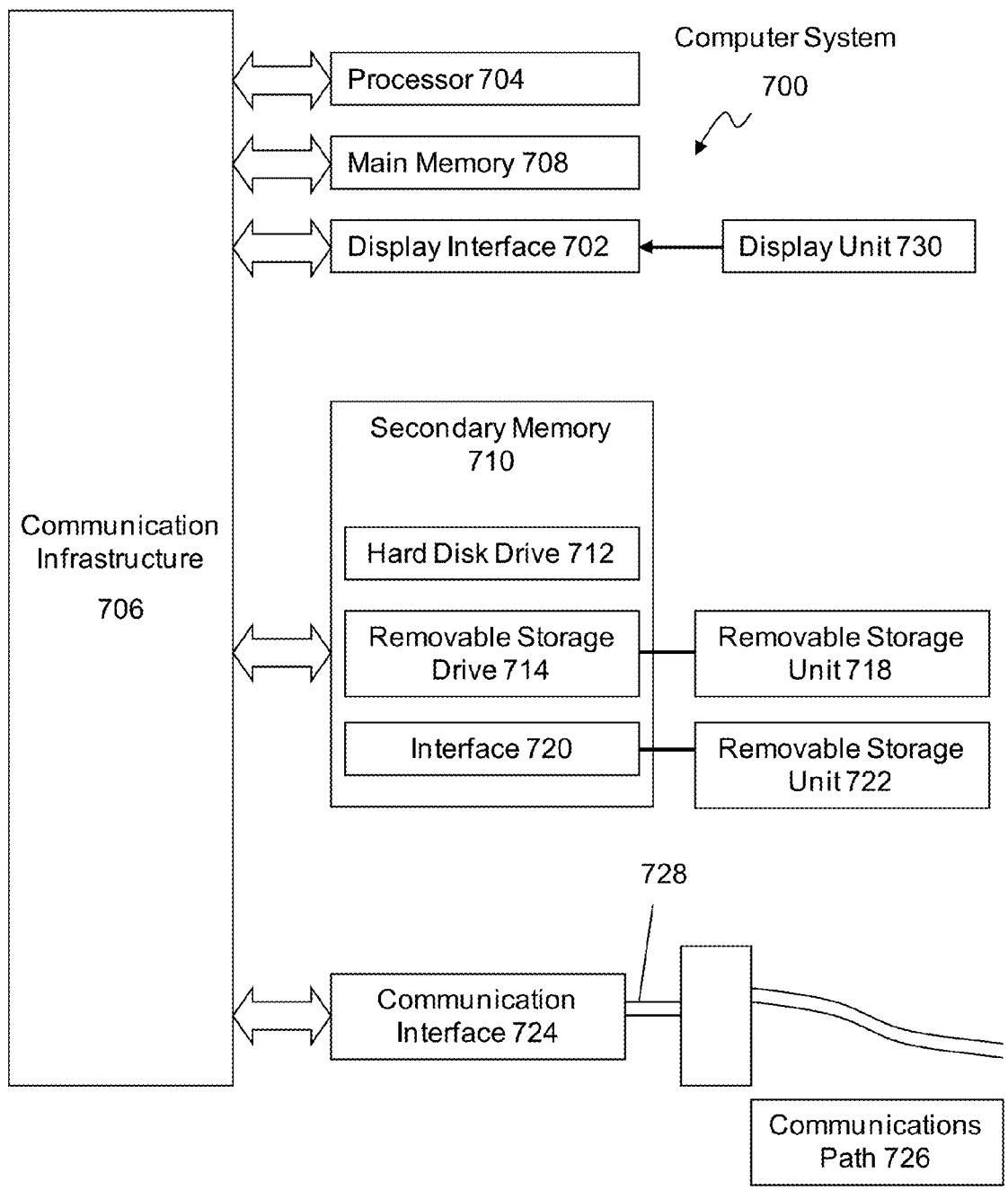
FIG. 7 presents an example system diagram of various hardware components and other features, for use in accordance with aspects of the present application.

Aspects of the present application may be implemented using hardware, software, or a combination thereof and may be implemented in one or more computer systems or other processing systems. In one example, the application is directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software embodiments are described in terms of this example computer system. As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. After reading this description, it will become apparent to a person skilled in the relevant art(s) how to implement the application using other computer systems and/or architectures.

In one aspect, computer system 700 can include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative examples, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels.

In this document, the terms "computer program medium" and "computer usable medium" are used to refer generally to media such as a removable storage drive, a hard disk installed in hard disk drive 712, and signals 728. These computer program products provide software to the computer system 700. The application is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present application, as discussed herein. In particular, the computer programs, when executed, enable the processor 704 to perform the features of the present application. Accordingly, such computer programs represent controllers of the computer system 700.

In an example where the application can be implemented using software, the software may be stored in a computer program product and loaded into computer system 700 using removable storage drive 714, hard drive 712, or communications interface 724. The control logic (software), when executed by the processor 704, causes the processor 704 to perform the functions of the application as described herein. In another example, the application may be implemented primarily in hardware using, for example, hardware components, such as application specific integrated circuits (ASICs). Implementation of the hardware state machine so as to perform the functions described herein will be apparent to persons skilled in the relevant art(s).

In yet another illustration, the application may be implemented using a combination of both hardware and software.

Figure 8:
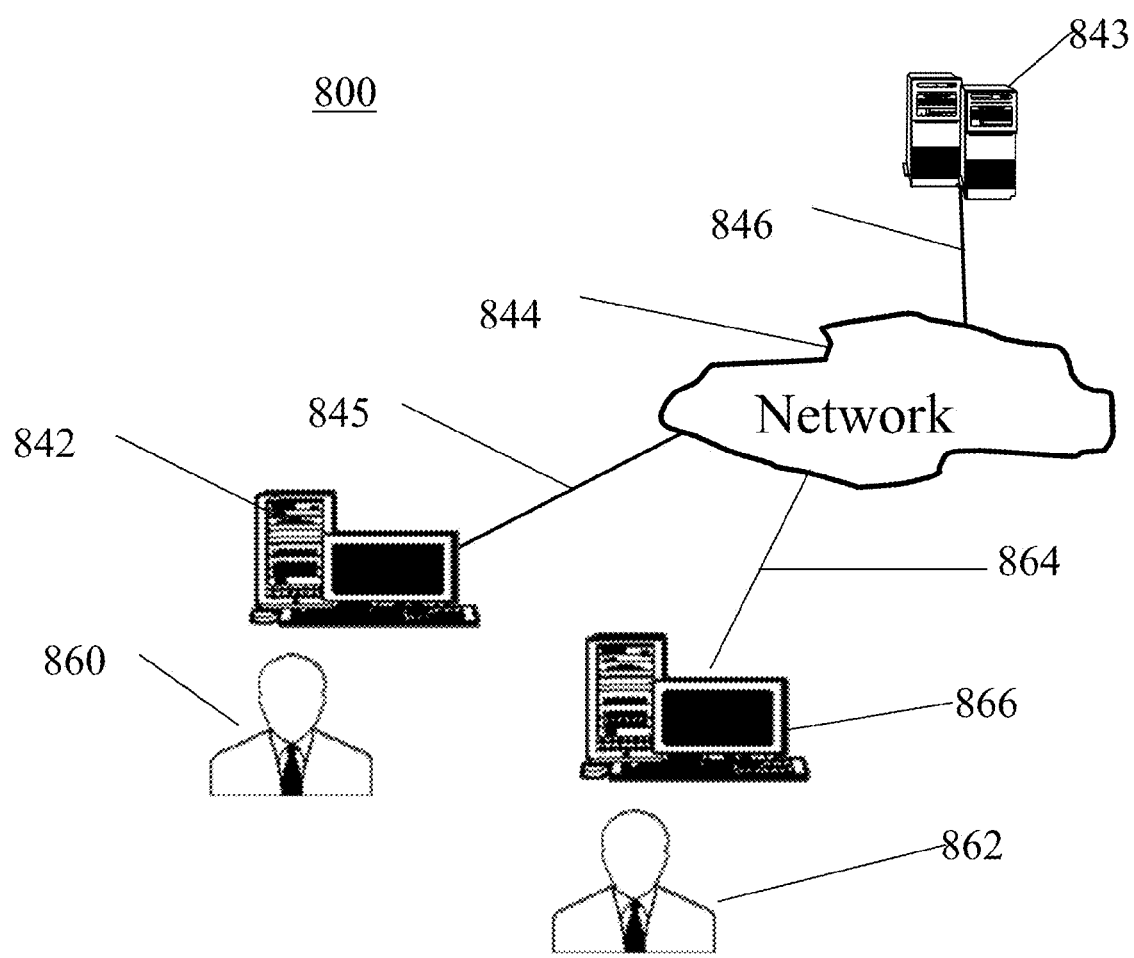
FIG. 8 is a schematic diagram of various example system components, in accordance with aspects of the present application.

FIG. 8 is a schematic diagram of various example system components, in accordance with aspects of the present application. FIG. 8 shows a communication system 800 usable in accordance with aspects of the present application. The communication system 800 can include one or more accessors 860, 862 (also referred to interchangeably herein as one or more "users") and one or more terminals 842, 866. In one example, data for use in accordance with the present application is, for example, input and/or accessed by accessors 860, 862 via terminals 842, 766, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber-optic links. In another example, the method and system of the present application operate in a stand-alone environment, such as on a single terminal (not shown here).

While aspects of this application have been described in conjunction with the examples outlined above, various alternatives, modifications, variations, improvements, and/or substantial equivalents, whether known or that are or may be presently unforeseen, may become apparent to those having at least ordinary skill in the art. Accordingly, the examples, as set forth above, are intended to be illustrative, not limiting. Various changes may be made without departing from the spirit and scope of the application. Therefore, the application is intended to embrace all known or later-developed alternatives, modifications, variations, improvements, and/or substantial equivalents.

The invention claimed is:

1. A light fixture monitoring and communication device, the device comprising:
a monitor for monitoring an operational characteristic of a light source comprised in the light fixture;
a communication component positioned between the power supply device and the light source, the communication component including:
a wireless transmitter configured to wirelessly transmit information regarding the monitored operational characteristic to a remote management device,
wherein the device is located internal to the light fixture and integrated with the light fixture.

2. The device according to claim 1, wherein the communication component comprises a two-way, Radio Frequency (RF) to WiFi communications device.

3. The device according to claim 2, wherein the communication component comprises a receiver configured to receive instructions to control the light fixture from the remote management device.

4. The device according to claim 3, wherein the instructions comprise instructions to control a dimming function of the light fixture.

5. The device according to claim 1, wherein the device is positioned on a direct current (DC) side of a power supply comprised in the light fixture.

6. The device according to claim 1, wherein the device is configured to receive measurement information from a power monitor configured to collect real-time alternating current (AC) current, voltage, and power factor measurements within the power supply.

7. The device according to claim 1, wherein the device is configured to receive surge protection information from a surge protection component, the surge protection component including a surge protection monitor configured to indicate whether surge protection is currently provided by the surge protection component, and
wherein the communications component is configured to report when surge protection is not being provided by the surge protection component.

8. The device according to claim 1, wherein the monitored characteristic comprises at least one selected from a group consisting of current consumption, wattage, real-time temperature, a brightness level, and an efficiency of the light fixture.

9. The device according to claim 1, wherein the device is further configured to modify operation of the light fixture based on instructions received from a remote management device.

10. The device according to claim 8, wherein the device comprises a dimmer that is controlled via the communications component.

11. The device according to claim 1, further comprising:
a programmable photocell device having a photocell sensor configured to detect the amount of light in an environment surrounding the light fixture, wherein the photocell device is configured to be programmed wirelessly from a remote management device in order to adjust a threshold level of the photocell.

12. The device according to claim 11, further comprising:
a light transmission tube that protrudes from the light fixture and that is configured to pass light from the exterior of the light fixture to the photocell sensor.

13. A remote management device for controlling a remote light fixture, the device comprising:
- a receiver configured to wirelessly receive operational metrics transmitted from the light fixture; and
- a transmitter configured to transmit instructions for controlling the light fixture.

14. The remote management device according to claim 13, wherein the operational metrics comprise at least one selected from a group consisting of current consumption, wattage, real-time temperature, a brightness level, and an efficiency of the light fixture.

15. The remote management device according to claim 13, wherein the device is configured to receive operational metrics from a plurality of light fixtures that are physically located remotely from each other.

16. The remote management device according to claim 15, wherein the transmitter is configured to control a dimming feature at each of the plurality of light fixtures.

17. The remote management device according to claim 16, wherein the device is configured to control the dimming feature of at least a subset of the plurality of light fixtures contemporaneously as part of an array.

18. The remote management device according to claim 17, wherein the device is configured to control the dimming feature of a second subset of the plurality of light fixtures as a second array at a different dimming level than the other array.

19. A surge protection device comprising:
- an input configured to be connected to an alternating current (AC) power source;
- an output;
- a connection between the input and output for transmitting power from the input to the output;
- a surge protection component configured to provide surge protection to the connection between the input and output; and
- a monitor coupled to the surge protection component, the monitor configured to monitor the surge protected connection,
- wherein the monitor is configured to provide a signal via an optical isolation device contemporaneously with the surge protection component functioning to provide the surge protected connection between the input and the output, and
- wherein the monitor is configured to cease the signal to the optical isolation device when operation of the surge protection component ceases.

20. A smart metered light fixture comprising:
- a light source;
- a power supply device;
- a monitor configured to collect real-time alternating current (AC) current, voltage, and power factor measurements used by a power supply for the light source; and
- a connection through an optical isolation device configured to transmit the collected measurements to a communications device located on a DC side of the power supply.

21. A light fixture comprising:
- a solid state light source;
- a surge protection device;
- a power supply positioned between the surge protection device and the light source;
- a communications device positioned between the power supply device and the light source;
- a monitor configured to collect real-time alternating current (AC) current, voltage, and power factor measurements from a power supply having an first optical isolation device configured to transmit the collected measurements to the communications device,
- wherein the surge protection device is circuitably positioned between an AC power source and the power supply, the surge protection device having:
  - an input configured to be connected to the AC power source;
  - an output;
  - a connection between the input and output for transmitting power from the input to the output;
  - a surge protection component configured to provide surge protection to the connection between the input and output; and
  - a monitor connected to the surge protection component, the monitor configured to monitor the surge protected connection,
- wherein the monitor is configured to provide a signal via a second optical isolation device contemporaneously with the surge protection component functioning to provide the surge protected connection between the input and the output,
- wherein the monitor is configured to cease the signal to the optical isolation device when the surge protection component ceases operation, and
- wherein the communications device includes:
  - an operational characteristic monitor for monitoring an operational characteristic of the light source;
  - a receiver configured to receive a signal from the first and second optical isolation devices and to receive data from the operational characteristic monitor; and
  - a wireless transmitter for wirelessly transmitting information regarding the monitored operational characteristic and information from the optical isolation devices.

22. The light fixture according to claim 21, further comprising:
- a programmable photocell device having a photocell sensor configured to detect the amount of light in an environment surrounding the light fixture, wherein the photocell device is configured to be programmed wirelessly from a remote management device in order to adjust a threshold level of the photocell; and
- a light transmission tube that protrudes from the light fixture and that is configured to pass light from the exterior of the light fixture to the photocell sensor.

23. A programmable photocell device for use with a light fixture, the device comprising:
- a photocell sensor configured to detect the amount of light in the environment surrounding the light fixture,
- wherein the photocell device is configured to be programmed wirelessly from a remote management device in order to adjust a threshold level of the photocell.

24. The device according to claim 23, further comprising:
- a light transmission tube that protrudes from the light fixture and that is configured to pass light from the exterior of the light fixture to the photocell sensor.

* * * * *